US008561898B2

(12) United States Patent
Durkee (10) Patent No.: US 8,561,898 B2
(45) Date of Patent: Oct. 22, 2013

(54) RATIO-METRIC HORIZON SENSING USING AN ARRAY OF THERMOPILES

(75) Inventor: Scott Robert Durkee, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 60 days.

(21) Appl. No.: 13/300,105

(22) Filed: Nov. 18, 2011

(65) Prior Publication Data

US 2013/0126612 A1 May 23, 2013

(51) Int. Cl.
*G06G 7/80* (2006.01)

(52) U.S. Cl.
USPC ............ 235/400; 235/411; 235/412; 235/413

(58) Field of Classification Search
USPC .................... 235/400, 411, 412, 413
See application file for complete search history.

(56) References Cited

U.S. PATENT DOCUMENTS

| | | | | | |
|---|---|---|---|---|---|
| 3,170,655 | A | * | 2/1965 | Pierce | 102/377 |
| 3,253,150 | A | * | 5/1966 | Farmer | 250/347 |
| 3,311,747 | A | * | 3/1967 | Smith, Jr. et al. | 250/347 |
| 3,348,048 | A | * | 10/1967 | McLauchlan et al. | 250/349 |
| 3,418,478 | A | * | 12/1968 | Falbel | 250/202 |
| 3,434,142 | A | * | 3/1969 | Magargel et al. | 342/354 |
| 3,551,681 | A | * | 12/1970 | Astheimer | 250/206.1 |
| 4,328,421 | A | * | 5/1982 | Falbel | 250/347 |
| 4,432,060 | A | * | 2/1984 | Cargille | 701/3 |
| 4,914,287 | A | * | 4/1990 | Savoca | 250/216 |
| 5,168,152 | A | | 12/1992 | Kelley | |
| 5,744,801 | A | * | 4/1998 | Diedrickson | 250/349 |
| 5,841,018 | A | | 11/1998 | Watson et al. | |
| 6,066,850 | A | * | 5/2000 | Hersom et al. | 250/342 |
| 6,181,989 | B1 | * | 1/2001 | Gwozdecki | 701/4 |
| 7,963,442 | B2 | | 6/2011 | Jenkins et al. | |
| 7,977,613 | B2 | | 7/2011 | Rastegar et al. | |
| 2007/0088496 | A1 | * | 4/2007 | Preston | 701/207 |
| 2008/0061188 | A1 | | 3/2008 | Morris et al. | |

FOREIGN PATENT DOCUMENTS

DE 2835232 A1 2/1980
JP 2008241320 A 10/2008

OTHER PUBLICATIONS

ILG, Mark Dean, Guidance, Navigation, and Control for Munitions, Thesis submitted to the Faculty of Drexel University, May 2008, 138 pgs.
Dexter Research Center, Inc., ST60 TO-5 & ST60R TO-5 With Diffractive Lens, 3 pgs, www.DexterResearch.com, Dexter, MI.
European Search Report dated Mar. 14, 2013 for Application No. 12193042.4.

* cited by examiner

*Primary Examiner* — Daniel Hess
*Assistant Examiner* — Paultep Savusdiphol
(74) *Attorney, Agent, or Firm* — Cantor Colburn LLP (57) ABSTRACT

An example method includes receiving output voltage data from an array of at least four thermopiles placed around the circumference of a projectile such that for any rotation of the projectile during flight thereof, at least a pair of the thermopile having upwardly-facing fields of view referenced to the earth-fixed coordinate system. The method includes determining the pair of upwardly-facing thermopiles based on the output voltage data from the array, with the respective pair of thermopiles including a thermopile p and next adjacent thermopile p+1. The method includes determining a ratio of the output voltage data from thermopiles p and p+1, and applying the ratio to a function associating, for any pair of thermopiles n and n+1, a ratio of output voltage data from thermopiles n and n+1, and a roll angle $\theta_n$ of thermopile n referenced to the earth-fixed coordinate system.

21 Claims, 10 Drawing Sheets

RATIO-METRIC HORIZON SENSING USING
AN ARRAY OF THERMOPILES

TECHNICAL FIELD

Example embodiments of the present invention generally relate to horizon sensing and, more particularly, relate to ratio-metric horizon sensing using an array of thermopiles.

BACKGROUND

Spin-stabilized artillery projectiles are gyroscopically stabilized, spinning rapidly about the projectile's longitudinal axis resulting from the action of the rifling during the launch sequence. In free flight after muzzle exit, aerodynamic forces act on the projectile body, producing a complex epicyclic motion of nutation and precession throughout the trajectory that may affect, and otherwise interfere with, a desired trajectory of the projectile.

As the range capability of artillery weapons and ammunition grows, accuracy and precision of delivery become increasingly important. Total delivery errors for standard, unguided 155 mm artillery projectiles, including all error sources, can exceed 300 meters at 30 km, while a point target size may be less than ten square meters. In such a case, the probability of hitting a specific point target at extended range will be low unless a large number of rounds are fired. A number of techniques have been proposed to provide some measure of control over the flight path of spin-stabilized projectiles, all aimed at enhancing the accuracy and precision of artillery fire sufficiently to improve the chance of impact at point targets at extended ranges with reduced expenditure of ammunition and without inflicting collateral damage on objects located in the vicinity of the desired target.

Many techniques for controlling the flight path of spin-stabilized projectiles require knowledge of the orientation of the projectile referenced to the earth-fixed coordinate system. There are a number of existing horizon sensors and techniques for sensing or otherwise measuring or determining the projectile's orientation, but it is generally beneficial to improve upon existing techniques.

BRIEF SUMMARY

Example embodiments of the present invention provide an improved apparatus, method and computer-readable storage medium for controlling operation of a salient-type, multiphase motor such as a BLDC motor. According to one example embodiment, an apparatus is provided that includes electronic circuitry mountable on a projectile including an array of at least four thermopiles placed around the circumference thereof such that for any rotation of the projectile during flight thereof, at least a pair of the thermopile have upwardly-facing fields of view referenced to the earth-fixed coordinate system. In one example, the projectile is a spin-stabilized projectile including a despun nose section onto which the thermopiles of the array are placed, and the thermopiles are long wavelength infrared (LWIR) thermopiles.

The electronic circuitry is configured to receive output voltage data from the array, and determine the pair of upwardly-facing thermopiles based on the output voltage data from the array, with the respective pair of thermopiles including a thermopile p and next adjacent thermopile p+1. In one example, the pair of upwardly-facing thermopiles may be determined by calculating a sum of the voltages of each pair of adjacent thermopiles, and identifying the pair whose sum is most negative.

The electronic circuitry is also configured to determine a ratio of the output voltage data from thermopiles p and p+1. And the electronic circuitry is configured to apply the ratio to a function associating, for any pair of thermopiles n and n+1, a ratio of output voltage data from thermopiles n and n+1, and a roll angle $\theta_n$ of thermopile n referenced to the earth-fixed coordinate system. In this regard, the ratio of the output voltage data from thermopiles p and p+1 may be applied to the function to determine a roll angle $\theta_p$ of thermopile p referenced to the earth-fixed coordinate system, with the roll angle $\theta_p$ representing an orientation of the projectile referenced to the earth-fixed coordinate system. In one example, each thermopile of the array is rotatable about a longitudinal axis of the projectile, and the roll angle $\theta_p$ is the angle between horizontal of the earth-fixed coordinate system and thermopile p.

In one example, the function to which the ratio is applied is a function having been generated from a second function associating, for any thermopile n, output voltage data from thermopile n and the roll angle $\theta_n$.

In one example, the electronic circuitry may be further configured to remove an effective bias value from the output voltage data from at least thermopiles p and p+1 to produce bias-corrected output voltage data for the respective thermopiles, with the effective bias value representing a bias on the output voltages imparted by an ambient air temperature. In this example, the function to which the ratio is applied associates a ratio of bias-corrected output voltage data from thermopiles n and n+1, and the roll angle $\theta_n$.

In one example, the electronic circuitry may be further configured to determine a rate of rotation of the projectile in at least first and second instances. In this example, the electronic circuitry may be configured to receive the output voltage data, determine the pair of upwardly-facing thermopiles, and determine and apply the ratio in the first instance in which the rate of rotation is lower than in the second instance. And in the second instance, the electronic circuitry may be configured to receive data from a Global Positioning System (GPS) placed on the projectile, and determine the orientation of the projectile referenced to the earth-fixed coordinate system based on the data from the GPS.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like. References may also be made to terms of direction or orientation such as left, right, up, down, clockwise or counterclockwise. It should be understood that these and other similar references may be interchangeable. That is, references to left may equally apply to right and vice versa, up to down and vice versa, and clockwise to counterclockwise and vice versa.

Example embodiments of the present invention generally relate to horizon sensing from a spin-stabilized projectile. Example embodiments will be described herein in the context of a projectile including a Reconfigurable Nose Control System (RNCS), such as that described by U.S. Pat. No. 7,963,442, the content of which is incorporated herein by reference. It should be understood, however, that example embodiments may be equally applicable to any of a number of other types of spin-stabilized projectiles, and that references to the RNCS or its components are provided herein only by way of example.

Figure 1:
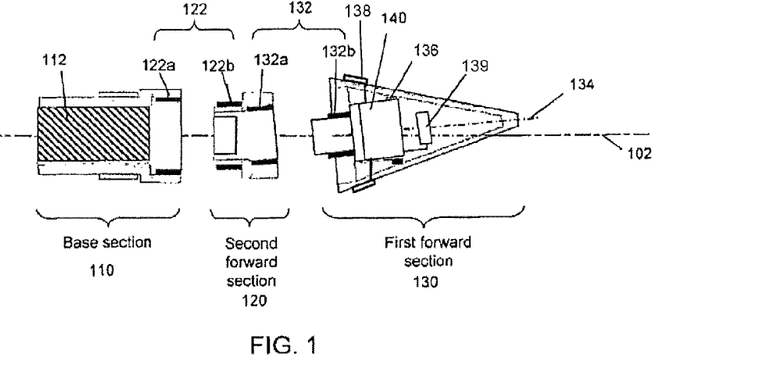
FIG. 1 illustrates a side view of Reconfigurable Nose Control System (RNCS) according to an example embodiment of the present invention.

FIG. 1 illustrates an example embodiment of a Reconfigurable Nose Control System (RNCS) 100 according to the system described herein. The RNCS may include three sections: a first forward section 130, a second forward section 120 and a base section 110. The base section may interface with a projectile body and include a fuze volume 112 to interface with fuze threads of the projectile body. The base section and the second forward section may include a Roll Motor Generator (RMG) 122 that functions as discussed elsewhere herein and may include other components as part of a roll motor generator assembly. The first forward section and the second forward section may include a Divert Motor (DM) 132 that functions as discussed elsewhere herein and may include other components as part of a divert motor assembly. The DM may be used to deflect the first forward section of the nose cone, as further discussed elsewhere herein. As illustrated, the first forward section may include an ogive portion, which is a curved surface used to form the aerodynamically streamlined nose of the projectile.

The first forward section 130 may be disposed at an axial offset 134 with respect to a longitudinal (roll) axis 102 of the projectile body. The axial offset may be five degrees, although other deflection values may be selected in accordance with the operating principle of the system described herein. The deflection of the first forward section may then be controlled to a value, for example between zero and two times the axial offset (ten degrees), by simple rotary motion of a motor, such as the Divert Motor (DM) 132 or other actuator. Using a motor, such as the RMG 122 or other actuator, the deflected ogive of the first forward section may be rotated so that its axis points in any direction or orientation within its range of motion. Accordingly, the second forward section 120 deflection and orientation may be modulated by action of the DM and the RMG, as further discussed elsewhere herein.

In an example embodiment, the DM 132 includes a magnet component 132a and a wiring component 132b, and the RMG 122 includes a magnet component 122a and a winding component 122b, each of which may be implemented as stator/rotor configurations as part of electromagnetic motors. Other motor configurations and operations are possible and may be suitable for implementation with the present system. For example, piezoelectric motors may be used.

The projectile may include one or more mechanisms for transmitting and receiving data during launch and flight. In an example embodiment, the RCNS 100 includes an inductive fuze setter coil 136 that may be used to receive data transmitted to the projectile, such as time-of-flight data, time-to-burst data, target coordinates and/or other data. The inductive fuze setter coil may be inductively coupled to an external device (not shown) that may also include a coil which, when placed in close proximity to the internal coil within the projectile, becomes inductively coupled to the internal projectile coil. The external device coil may be excited and modulated to communicate data to the projectile, and the internal inductive fuze setter coil may receive and then provide the data to appropriate on-board electronic circuitry 140 included within the projectile. As further discussed elsewhere herein, the RCNS 100 may further include an array of thermopiles (sensors) 138 to provide data for determining or otherwise calculating the orientation of the projectile referenced (relative or with respect to) to the earth-fixed coordinate system. In some example embodiments, other data transfer mechanisms may be used for transferring data to and from the projectile during launch and flight, including the use of a Global Positioning System (GPS) 139, as further discussed elsewhere herein.

Figure 2:
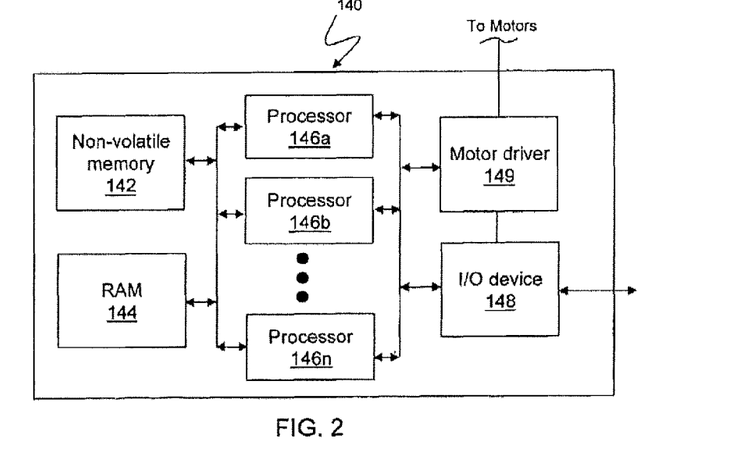
FIG. 2 is a schematic illustration of on-board electronic circuitry of a RNCS according to an example embodiment of the present invention.

FIG. 2 is a schematic illustration of the on-board electronic circuitry 140 of the RNCS 100 according to an example embodiment of the present invention. The on-board electronic circuitry of the projectile may include non-volatile memory 142, RAM or other volatile memory 144, one or more on-board processors 146 (a number of which are shown as processors 146a, 146b . . . 146n) and/or an input/output device 148. Each processor may be embodied as or otherwise include any of a number of different means for performing functions such as those described herein. For example, the processor may be embodied as or otherwise include one or more microprocessors, coprocessors, controllers, special-purpose integrated circuits such as, for example, application specific integrated circuits (ASICs), field programmable gate arrays (FPGAs), digital signal processors (DSPs), hardware accelerators, processing circuitry or other similar hardware. Additionally or alternatively, for example, the processor may include one or more transistors, logic gates, a clock (e.g., oscillator) or other circuitry. Further for example, the processor may include one or more memory devices (e.g., non-volatile memory, volatile memory) configured to store instructions for execution by the processor for performing one or more of its functions.

The input/output device 148 may operate in connection with the inductive fuze setter device 136, thermopiles 138, GPS 139 and/or other data transfer mechanisms external to the RNCS 100. The on-board electronic circuitry may be electrically coupled to the DM 132 and the RMG 122 via a motor driver 149 that controls modulation of the DM and RMG to adjust the deflection and direction of the first forward section 130 according to in-flight calculations performed by the on-board electronic circuitry in response to data received by the RNCS, as further discussed elsewhere herein. In some example embodiments, the RMG and/or DM motors may include sensors that provide feedback to the on-board electronic circuitry to confirm appropriate actuation of the motors in accordance with actuation signals generated by the motor driver.

The deflection and direction of the first forward section 130 of the nose cone drives the projectile body to assume an angle of attack relative to local air flow, where the moment of aerodynamic forces from the projectile body angle of attack counterbalances the moment of aerodynamic forces from the deflected nose cone. The resultant of the aerodynamic forces acting on the entire projectile, including nose cone, acts to modify the flight path followed by the projectile, and the location of the impact point is appropriately adjusted. The deflection and direction of the first forward section may be completely reversible at any time during flight through function of the rotations of the RMG 122 and DM 132, thereby returning the projectile during flight to a purely ballistic configuration of minimum drag, if desired.

As described herein, the RNCS 100 produces a small side force on the ogive portion of the first forward section 130 by deflecting the nose cone so that the longitudinal axis of the nose cone forms an angle with the longitudinal axis of the projectile and hence the local air flow. Since the nose cone is despun to zero or other low rotation rate referenced to earth-fixed coordinates soon after muzzle exit, the asymmetry of nose forces causes the projectile to assume a body angle of attack relative to local air flow. This body angle of attack generates forces acting through the projectile center of mass to modify the ground impact point by a predictable amount. For a specific projectile, the magnitude and direction of the impact point modification may depend on the commanded nose angle of attack, pointing angle of the nose cone axis referenced to earth fixed coordinates, projectile velocity, local air density, duration of application of control force, and/or other criteria.

The mechanisms of the RNCS 100 producing the nose control deflection may involve a simple rotary motion of two motors or actuators, as discussed elsewhere herein, and hence exhibit high reliability and ruggedness, with low manufacturing and assembly cost. In one example embodiment, the rearmost section base section 110 incorporates threads interfacing with the standard fuze threads of the projectile, and spins at the full spin of the projectile. The two forward sections 120, 130 of the RNCS may be locked together before active control begins and to the rearmost base section during launch and subsequently unlocked after launch. In other example embodiments, other actuator types and configurations may be suitable for use with the present system including, for example, the use of a tilt actuator and a rotary actuator (see, for example, U.S. Pat. No. 6,364,248 to Spate et al., the content of which is incorporated herein by reference).

Figure 3A:
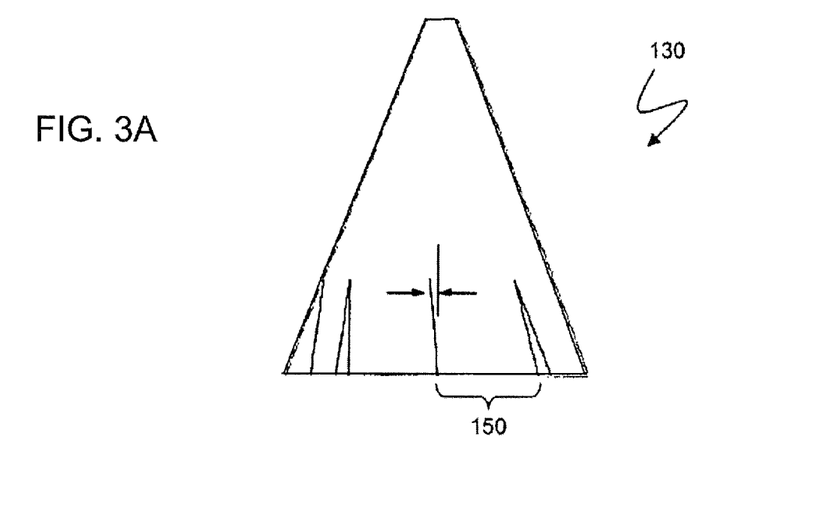
FIGS. 3A and 3B are schematic views of a nose cone showing an example of aerodynamic surfaces to despin the first and second sections on an external surface according to an example embodiment of the present invention.
Figure 3B:
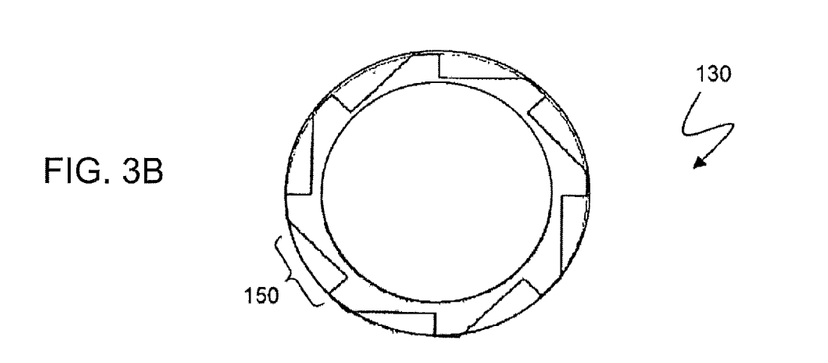

As seen in FIGS. 3A and 3B, an external surface of the nose cone first forward section 130 may include a number of aerodynamic surfaces 150 designed to induce a roll torque about the longitudinal axis of the nose cone. In these figures the aerodynamic surfaces are exemplified as undercuts (e.g., strakes), but could also be any other of a number of appropriate surfaces capable of performing a similar function. FIG. 3A is a side view of the external surface of the first forward section, and FIG. 3B is a view from the base section looking forward to the first forward section. The aerodynamic surfaces may be designed to produce a roll torque in response to local air flow that opposes the spin of the projectile (for example, clockwise as viewed from the base of the projectile looking forward in FIG. 3A). The roll torque generated by the aerodynamic surfaces rapidly despins the two forward nose cone sections 120, 130 following muzzle exit, reaching zero or low-rate spin referenced to earth fixed coordinates in less than two seconds. Free rotation under action of local air flow may cause the forward nose cone sections to rotate at a small percentage of the projectile spin, and in the opposite sense depending on specific design features of the aerodynamic surfaces.

As indicated above, the RNCS 100 may include an array of thermopiles 138 to provide data for performing a horizon sensing to determine or otherwise calculate the orientation of the projectile referenced to the earth-fixed coordinate system. The RNCS may include any of a number of different suitable thermopiles. In one example embodiment, the thermopiles are sensors with an optical window predominately if not exclusively in the long wavelength infrared (LWIR) region of the electromagnetic spectrum, and in particular the LWIR region transmitted by the earth's surface (primarily in the region of about 8-12 µm). The thermopiles may also be configured to provide sufficient sensitivity in different environmental conditions and time response for measurements. One example of a suitable thermopile is the ST60 silicon-based thermopile detector (e.g., Xenon-filled ST60) manufactured by Dexter Research, Inc. In various examples, the thermopiles may be individually or collectively coupled to an operational amplifier or other circuitry to amplify or otherwise condition their data for the on-board electronic circuitry 140.

The position, number and arrangement of the thermopiles 138 may also be selected in a number of different manners. In one example embodiment, the RNCS 100 includes a plurality of thermopiles having similar outwardly-projecting fields of view, and that are placed equidistant from one another around the circumference of the first forward section 130. In one example, the thermopiles are placed such that for any rotation of the projectile and RNCS, at least a pair of the thermopiles have upwardly-facing fields of view (facing horizontally or upward toward the earth's atmosphere). In one example, each of the thermopiles may be configured as a triad to increase sensitivity during large ascent and descent angles of the projectile.

Figure 4:
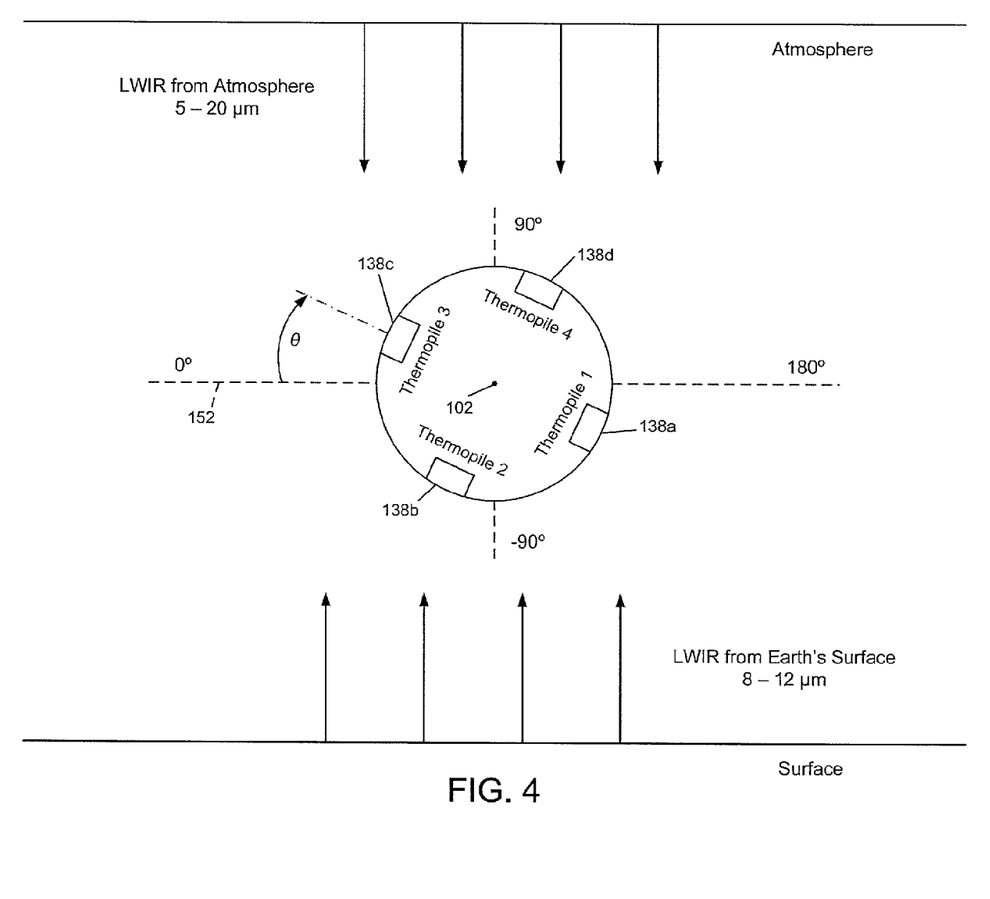
FIG. 4 is a schematic illustration of a back (or front) view of a projectile including a RNCS according to an example embodiment of the present invention.

In a more particular example described herein, the RNCS 100 may include an array of four thermopiles 138 placed at 90° intervals around the first forward section 130, and numbered in clockwise order viewed from the back of the projectile including the RNCS 100 (described as clockwise but may be equally counterclockwise). This is shown in FIG. 4, which illustrates a four-quadrant array of LWIR thermopiles (shown as thermopiles 138a, 138b, 138c and 138d corresponding to thermopiles 1, 2, 3 and 4, respectively). As discussed elsewhere herein, each of the thermopiles may sense thermal energy radiated by the earth's atmosphere and/or surface (ground) depending on its orientation, and generate an output voltage (data) proportional to a local temperature difference relative to the earth's atmosphere and/or surface. This data may then be supplied to the on-board electronic circuitry 140, which may determine or otherwise calculate the orientation of the projectile.

The following provides a more detailed description of a horizon sensing method in the context of a four-quadrant array of thermopiles 138 as shown in FIG. 4, according to an example embodiment of the present invention. As shown, roll of the RNCS 100 may be measured by the angular rotation of the projectile about its longitudinal axis 102 with reference to the earth-fixed coordinate system horizontal (earth's surface) 152. Each of the thermopiles may have an angular rotation expressed by a roll angle θ between the earth's surface (horizontal) and the respective thermopile. The roll angle of the projectile, then, may be taken as the roll angle of one of the thermopiles, generically referred to as thermopile p having roll angle $\theta_p$. In one example, thermopile p is the first of the thermopiles in the clockwise direction from the horizontal whose field of view faces upward toward the earth's atmosphere (e.g., in the region from 0° to 180°, illustrated in FIG. 4 for example as thermopile 3 138c. As the projectile and thus the RNCS may experience some rotation during flight, thermopile p may vary from instance to instance, and may not be known a priori.

According to example embodiments, the thermopiles 138 may take LWIR measurements (readings) and output corresponding voltages (data) at any time t, including voltages $V_1$, $V_2$, $V_3$ and $V_4$ from thermopiles 1, 2, 3 and 4. The output voltages (data) from the thermopiles, including thermopile 1 138a, thermopile 2 138b, thermopile 3 138c and thermopile 4 138d, may be supplied to the on-board electronic circuitry 140, which may then determine or otherwise calculate the roll angle $\theta_p$ of the projectile based on the data.

To determine the projectile roll angle, the on-board electronic circuitry 140 may identify a pair of upwardly-facing ones of the thermopiles 138. Given the clockwise numbering of the thermopiles, identifying the pair of upwardly-facing ones of the thermopiles may also identify thermopile p to which the roll angle $\theta_p$ is referenced, as well as its next adjacent thermopile in the clockwise direction, thermopile p+1. In the case of a LWIR thermopile, the output voltage is generally more negative the more the thermopile faces upward toward the earth's atmosphere than downward toward the earth's surface. Thus, a pair of upwardly-facing thermopiles may be identified for example by calculating a sum of the voltages of each pair of adjacent thermopiles (thermopiles 1 and 2, thermopiles 2 and 3, thermopiles 3 and 4, and thermopiles 4 and 1) and identifying the pair whose sum is most negative. In the example of FIG. 4, the pair of upwardly-facing thermopiles may be identified as thermopile 3 138c (p=3) and thermopile 4 138d (p+1=4). In this example, the arrangement of thermopiles and their output voltages may be generally tabulated as in the following Table 1.

TABLE 1

| Thermopile | Angle (degrees) | $V_n$ (V) |
|---|---|---|
| 1 | $\theta_1 = \theta_p + 180°$ | $V_1$ |
| 2 | $\theta_2 = \theta_p - 90°$ | $V_2$ |
| 3 | $\theta_3 = \theta_p$ | $V_3$ |
| 4 | $\theta_4 = \theta_p + 90°$ | $V_4$ |

After identifying a pair of upwardly-facing thermopiles p and p+1, the roll angle $\theta_p$ may be determined based on either or both the output voltages of the respective thermopiles and a function associating the respective data and projectile roll angle $\theta_p$ (referred to herein without loss of generality as a "master function"). This master function may be generated by the on-board electronic circuitry 140 or, in one example, may be generated by an off-board computer or other processor and loaded onto the on-board electronic circuitry (e.g., stored in non-volatile memory 146) for use thereby. The master function and any other function described herein may be represented in any of a number of different manners, such as by formula, algorithm, graph, table or the like.

Figure 5:
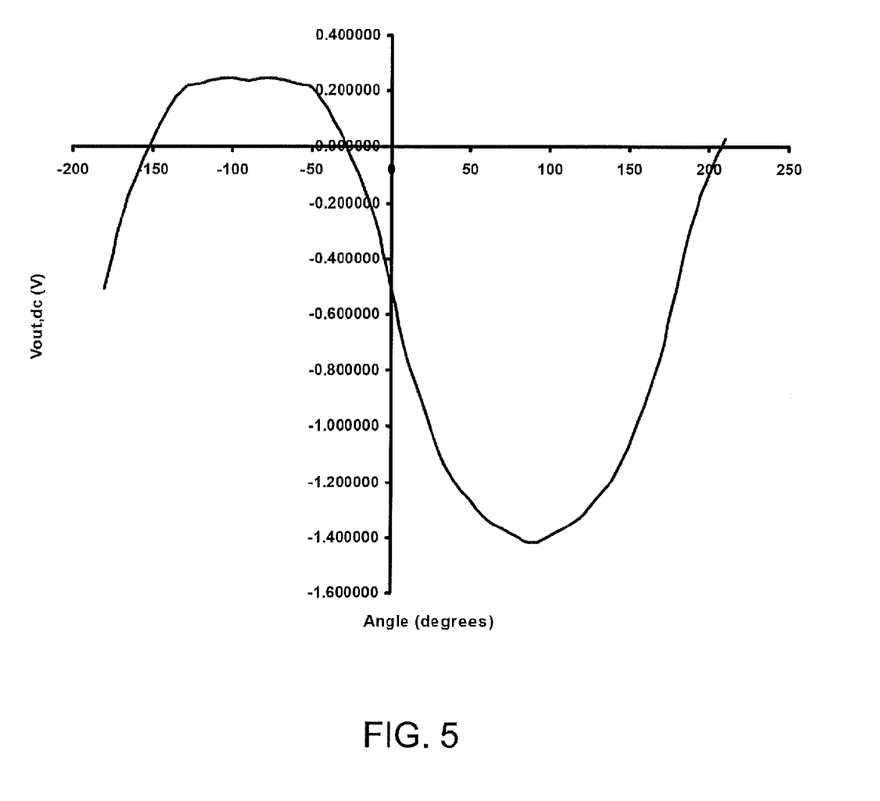
FIGS. 5-9 are graphs of example functions that may be generated according to example embodiments of the present invention.

The master function may be generated in any of a number of different manners. In one example, the master function may be generated from a second function associating, for any one of the thermopiles (thermopile n), its output voltage $V_n$ and roll angle $\theta_n$. This second function may be generated in any of a number of different manners, such as by experimentation. FIG. 5 is a graph illustrating the second function for a Xenon-filled ST60 according to one example.

Figure 6:
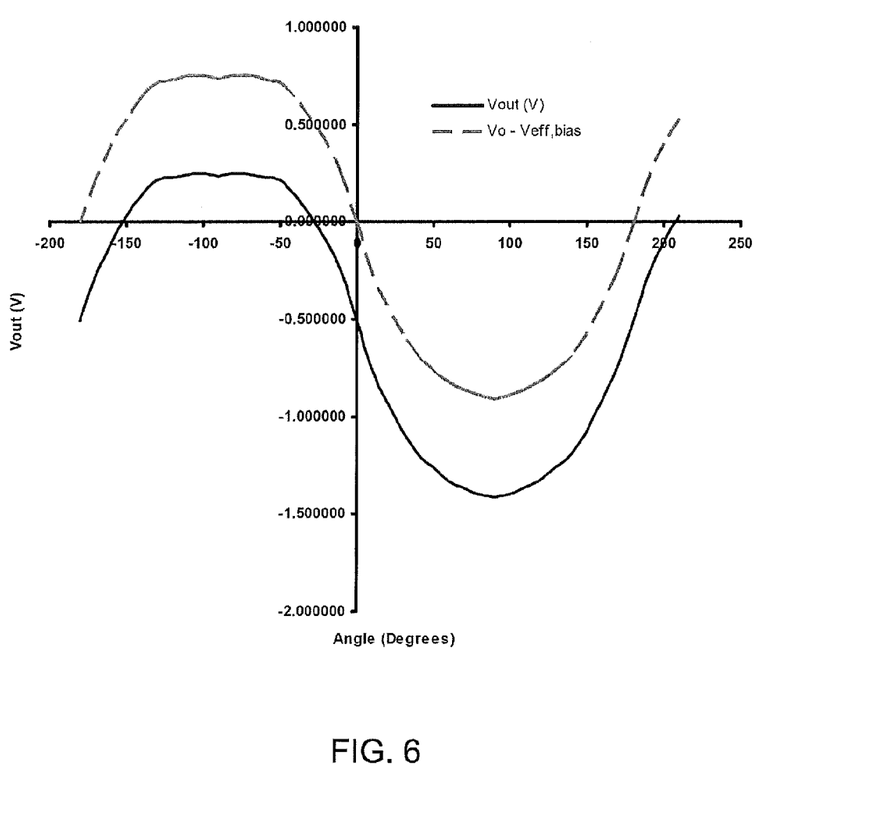

The ambient air temperature may impart a bias on the output voltages from the thermopiles 138. To remove its affect from the master function, an effective horizontal DC bias $V_{eff,bias}$ due to surrounding ambient air temperature may be determined or calculated, such as by experimentation, and subtracted from the voltage of the second function ($V_n - V_{eff,bias}$). FIG. 6 is a graph of the second function of FIG. 5 and its corresponding bias-corrected second function associating bias-corrected output voltage ($V_n - V_{eff,bias}$) and roll angle $\theta_n$. The master function may be generated from the corrected second function, and by removing the bias, the master function may not be affected by ambient air temperature or magnitude of the temperature differential between the earth's atmosphere and surface. Rather, the master function may be dictated solely by the thermopiles' field of view and sensitivity.

Figure 7:
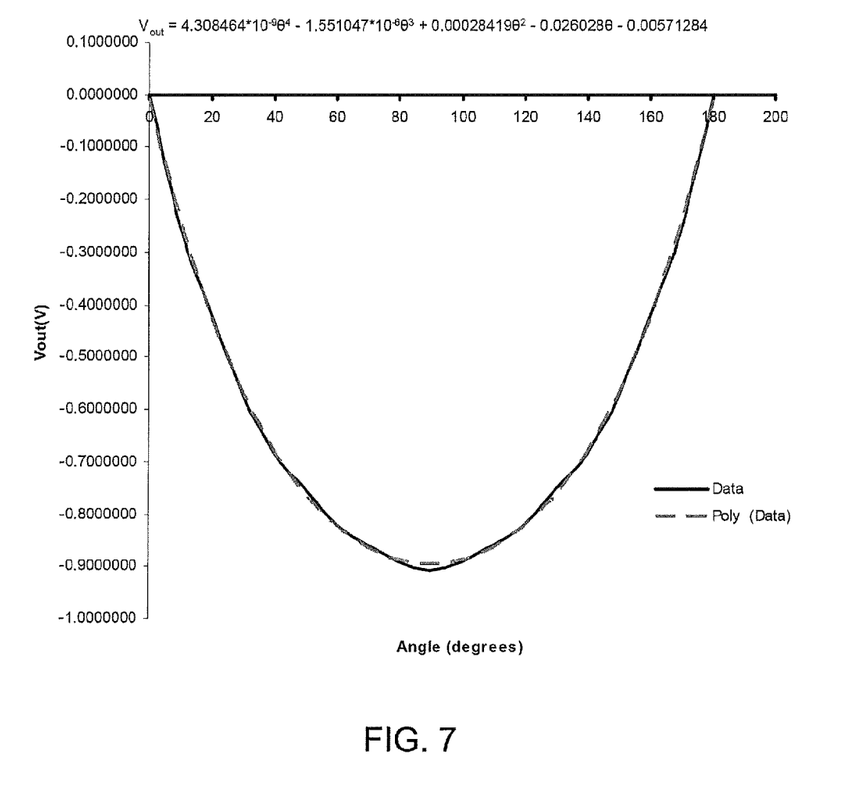

As indicated above, in the case of a LWIR thermopile, the output voltage is generally more negative the more the thermopile faces upward toward the earth's atmosphere than downward toward the earth's surface. Given the roll angle $\theta_n$ located in the upwardly-facing region from 0° to 180°, this region may be extracted from the corrected second function of FIG. 6 by application of a curve fit, and may (but need not) be normalized to create a third function. FIG. 7 illustrates the upwardly-facing region from 0° to 180° with a fourth-order curve fit given by:

$$(V_n - V_{eff,bias}) = (4.308464 \times 10^{-9}) \times \theta_n^4 - (1.551047 \times 10^{-6}) \times \theta_n^3 + (0.00028419) \times \theta_n^2 - (0.026028) \times \theta_n - 0.00571284$$

Figure 8:
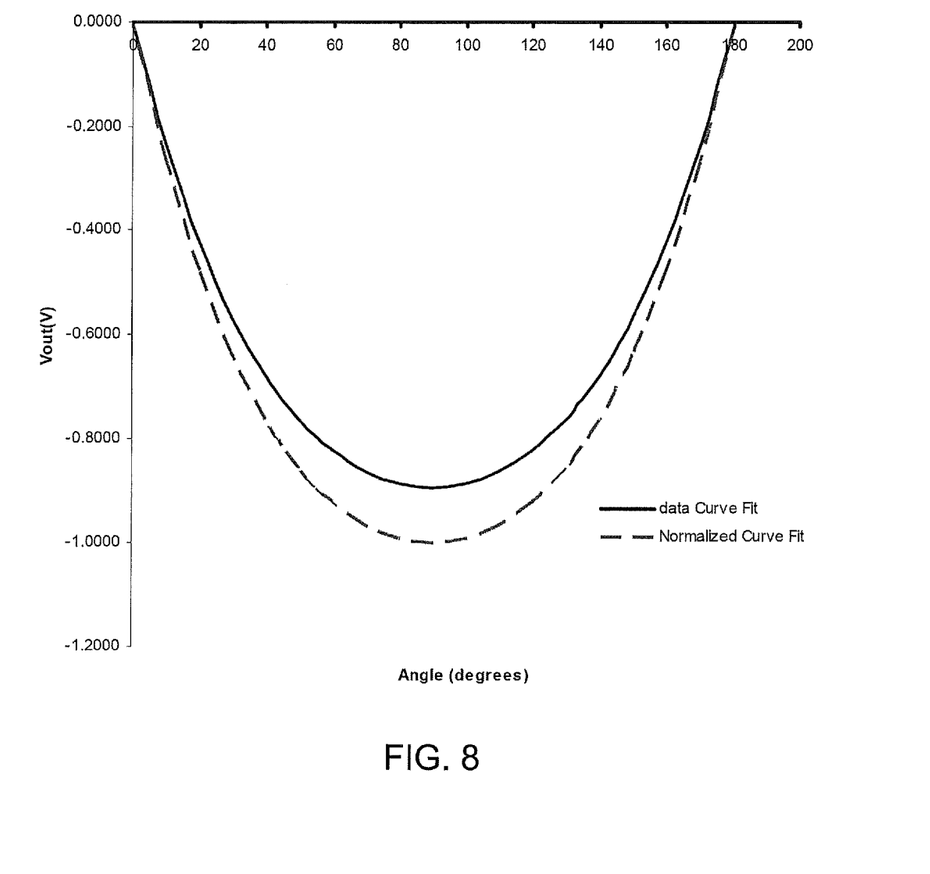

And FIG. 8 illustrates the resultant curve fit normalized to a peak value of 1.0, which may be given by the following third function:

$$\{V_n - V_{eff,bias}\}_{norm} = (4.817694 \times 10^{-9}) \times \theta_n^4 - (1.7343699 \times 10^{-6}) \times \theta_n^3 + (0.000317678) \times \theta_n^2 - (0.0291043) \times \theta_n - 0.00638801$$

Figure 9:
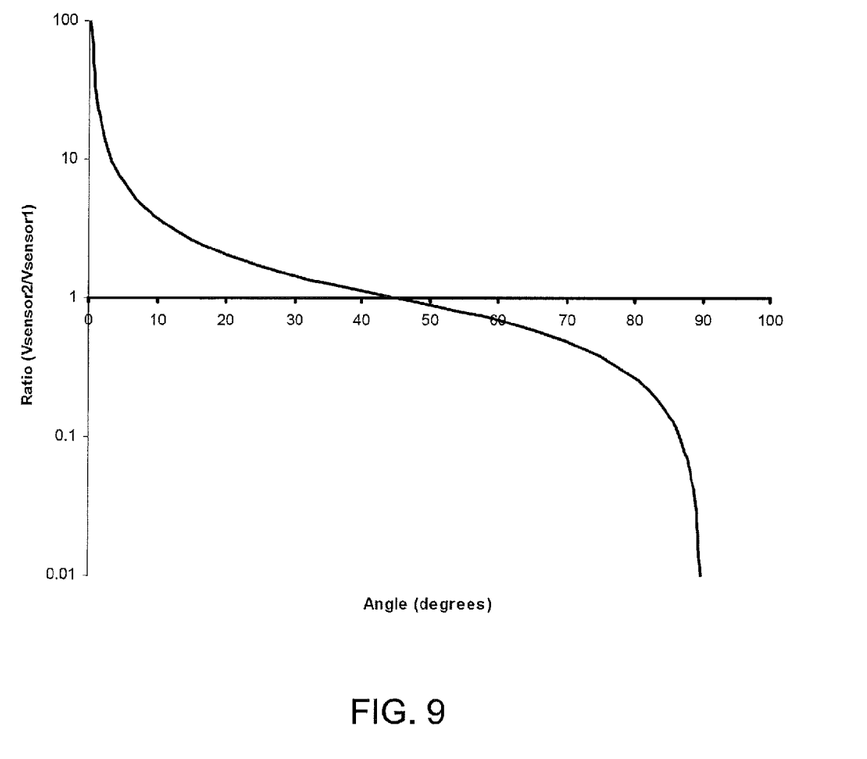

To increase the robustness of the roll angle $\theta_p$ determination, the master function may take a ratio-metric approach to determining the roll angle $\theta_p$ that makes the determination independent of the LWIR impinging on the thermopiles 138. In this regard, consider the ratio of bias-corrected output voltages from a pair of adjacent thermopiles n and n+1. This ratio $\{V_{n+1} - V_{bias,eff}\}_{norm} / \{V_n - V_{bias,eff}\}_{norm}$ for $0° < \theta_n < 90°$ for the normalized function of FIG. 8 may be calculated and plotted for the upwardly-facing thermopiles (n=p) as the master function, as shown for example in FIG. 9. As shown, the master function may extend to infinity at low and high roll angles. These discontinuities may be avoided in a number of different manners, such as by limiting the output voltages to a particular minimum value.

To determine the roll angle $\theta_p$ from the output voltages of the thermopiles 138 at time t, then, the on-board electronic circuitry 140 may remove the effective horizontal DC bias $V_{bias,eff}$ from at least the output voltages of the upwardly-facing pair of thermopiles, p and p+1. In one example, the bias at time t may be calculated as a function of the output voltages of all of the thermopiles as follows:

$$(V_1 + V_3)/2 = V_{bias1}$$

$$(V_2 + V_4)/2 = V_{bias2}$$

$$V_{bias,eff} = (V_{bias1} + V_{bias2})/2 \tag{1}$$

The on-board electronic circuitry may then subtract $V_{bias,eff}$ from the output voltages of at least the upwardly-facing pair of thermopiles 138, with the below Table 2 illustrating the bias being subtracted from all of the thermopile voltage data.

TABLE 2

| Thermopile | Angle (degrees) | $V_n - V_{bias,eff}$ (V) |
|---|---|---|
| 1 | $\theta_1 = \theta_p + 180°$ | $V_1 - V_{bias,eff}$ |
| 2 | $\theta_2 = \theta_p - 90°$ | $V_2 - V_{bias,eff}$ |
| 3 | $\theta_3 = \theta_p$ | $V_3 - V_{bias,eff}$ |
| 4 | $\theta_4 = \theta_p + 90°$ | $V_4 - V_{bias,eff}$ |

In the example of FIG. 4 in which p=3, the bias-corrected voltage ratio may given by $\{V_4-V_{bias,eff}\}_{norm}/\{V_3-V_{bias,eff}\}_{norm}$, and applied to the master function to solve for $0°<\theta_3<90°$. More generally, the bias-corrected voltage ratio of the upwardly-facing thermopiles may be given by $\{V_{p+1}-V_{bias,eff}\}_{norm}/\{V_p-V_{bias,eff}\}_{norm}$, and applied to the master function to solve for $0°<\theta_p<90°$. And since the relationship between the thermopiles is known, once any thermopile's position relative to the earth's surface is known, all of their positions relative to the earth's surface are known.

As will be appreciated, the ratio-metric horizon sensing technique of example embodiments of the present invention may be particularly useful in instances in which the two forward nose cone sections 120, 130 (or at least the section on which the thermopiles 138 are mounted) are despun to a zero or low rotation rate (e.g., 100 revolutions per minute). Conversely, other techniques for determining the orientation of the projectile, such as a GPS-based technique, may be more useful in instances in which the nose cone sections spin at higher rates. Example embodiments of the present invention may therefore be capable of implementing multiple techniques for determining the orientation of the projectile with respect to the earth-fixed coordinate system, and be configured to switchably implement the different techniques based on factors such as the rate of spin of the nose cone section of the projectile. At stationary and lower spinning rates, the on-board electronic circuitry 140 may be configured to implement the ratio-metric technique, and at higher spinning rates, the on-board electronic circuitry may be configured to switch to and implement the GPS technique utilizing signals from the GPS 139.

Referring again to FIG. 1, as further discussed in detail elsewhere herein, a first motor (e.g., RMG 122) may be positioned in the second forward section 120 of the RNCS 100 and used for rotary positional control while a second motor (e.g., DM 132) may be mounted on the second forward section of the RNCS and provide a means of rotating the first forward section relative to the second forward section, as further discussed elsewhere herein. By appropriate manipulation of the rotary motions of the RMG and DM, the nose deflection can be driven in a planar manner directly to the desired deflection magnitude and orientation. For example, this planar motion may be achieved by rotating the RMG in one direction and the DM in the opposite direction.

The RMG 122 may begin generating power shortly after launch (for example, at about two hundred msec) of the projectile. At about two seconds after launch, the variable load starts controlling rotation of the first forward section 130 and second forward section 120 to a small fraction of full spin (for example, approximately eighteen Hz in an opposite sense to the spin of the projectile body) while acquiring data from the thermopiles 138 that may be mounted on the first forward section. The exact value of the rotation rate depends on the precise dimensions of the aerodynamic surfaces and their configurations 150 in the first forward section and the launch dynamics. After obtaining data from the thermopiles, the on-board electronic circuitry 140 (see FIG. 2) determines or otherwise calculates the projectile's orientation based on the data. When orientation is determined with sufficient accuracy, an integrated Inertial Measurement Unit (IMU), that may be an implementation use of the processor(s) 146 of the on-board electronic circuitry, locks this value into the system, and control solution computations are initiated, as further discussed elsewhere herein.

As discussed herein, the first forward section 130 of the RNCS 100 may be mounted on a shaft positioned at a small angle to the longitudinal axis of the projectile. In one example embodiment, the small angle is five degrees, although different angles may be used with each configuration performing in a similar manner to that described herein. The DM 132 may be mounted on the second forward section 120 and provide a means of rotating the first forward section relative to the second forward section. As the first forward section is rotated about its axis through 180° with respect to the second forward section, the axis of the nose cone aerofoil surface traces a path where the angle between the ogive axis 134 and the projectile longitudinal axis 102 varies sinusoidally from a minimum of zero to a maximum deflection of two times the value of the offset between the ogive axis and the projectile longitudinal axis. For example, the maximum ogive deflection with respect to the longitudinal axis of the projectile body may be ten degrees in the disclosed example embodiment, although different deflection magnitudes may be configured in accordance with the system described herein.

At one extreme of the DM rotary motion, the axis 134 of the first forward section 130 and the longitudinal axis 102 of the projectile are coincident. This is called the "ballistic" configuration and may be used during projectile launch. There may be a direct correlation between rotation of the first forward section about its axis relative to the second forward section 120 and the resultant angle of attack of the nose cone ogive surface relative to local air flow. When the second forward section is subsequently rotated with respect to the earth-fixed coordinate system as previously fixed by the IMU or other sensor, the deflected first forward section may be caused to point in a particular desired direction, producing stable projectile angles of attack in any desired direction relative to earth-fixed coordinates. This effect permits both cross-range and down-range adjustment of the impact point.

The on-board processor(s) 146 (see FIG. 2) may compute Modified Point Mass (MPM) trajectory solutions, or other trajectory solutions, iteratively based on latest thermopile, GPS and/or other trajectory data, and provide predictions of the mean point of impact (MPI) indicating the most probable impact point. The coordinates of the predicted fall of shot may then be compared with the target coordinates and R/theta correction information is generated. A control algorithm, executable by the on-board processors, may be provided with the R/theta correction information within the available maneuver authority and use the correction information to adjust the deflection and direction of the first forward section 130 by manipulation of the RMG 122 and/or DM 132 to drive the predicted impact of the projectile towards coincidence with the target coordinates, as further discussed elsewhere herein.

Figure 10:
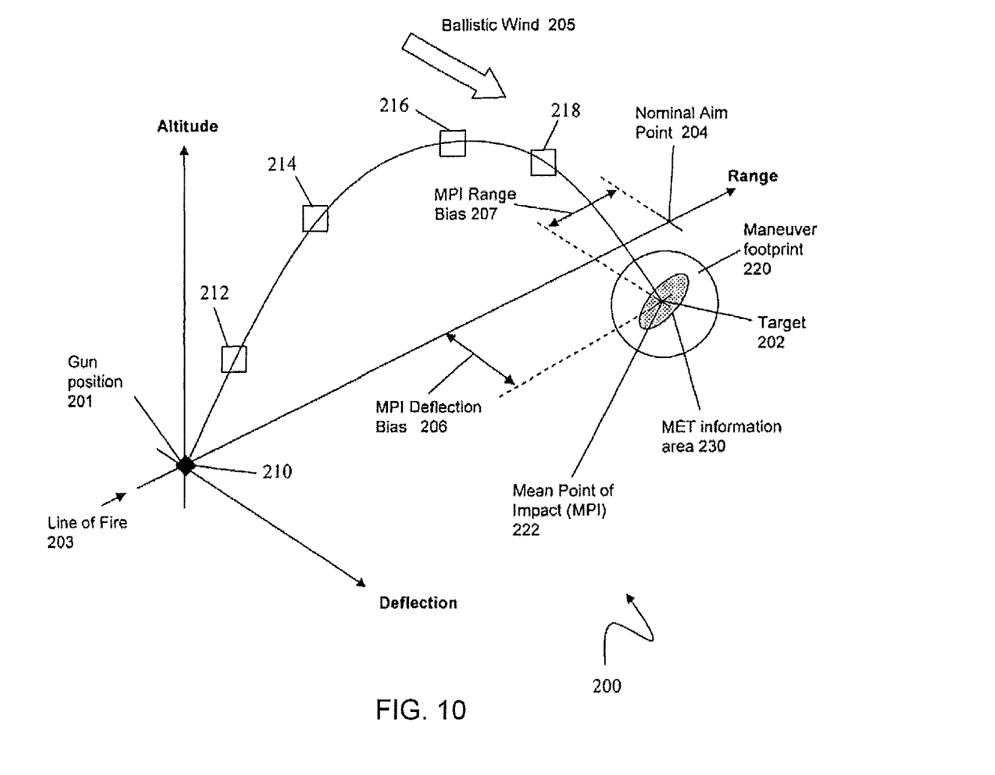
FIG. 10 is a schematic illustration of a projectile trajectory controlled by a RNCS according to an example embodiment of the present invention.

FIG. 10 is a schematic illustration of a projectile flight path 200 with a trajectory controlled by an RNCS according to an example embodiment of the present invention. The flight path is shown plotted on axes of altitude, deflection and range. A launching mechanism or gun is shown at a zero coordinate position 201 and aimed in the direction of a target 202 via line of fire 203 towards a nominal aim point 204. In the scenario shown, a right drift characteristic of spin stabilized projectiles and/or a ballistic wind 205 may cause a mean point of impact (MPI) deflection bias 206 and drag or other environmental conditions may cause an MPI Range bias 207.

As part of pre-firing procedures before launch as shown at position 210, the RCNS 100 may be initialized by data uploading such as by fuze setting, which may include uploading of trajectory information, such as target coordinates. After the projectile is launched, at trajectory position 212 on the up leg of the projectile flight path, RNCS actions may include nose cone despinning procedures, initiation of on-board power generation, acquisition of thermopile and/or GPS data, and initiation of an MPI predictor algorithm to calculate a trajectory solution and predict an MPI 222 with currently-available information, as further described elsewhere herein. At other trajectory positions 214, 216 and 218 (for example, the position 216 being the trajectory apogee), trajectory corrections of the RNCS may be initiated based on known information, including recently-received thermopile and/or GPS data and/or other information, that is fed to the on-board processors to calculate an updated MPI within a maneuver footprint 220 and to adjust the deflection and direction of the nose cone in the manner as described elsewhere herein. Other information during initialization may include most recent MET information (for example, two hour stale MET) that is available for a target area 230.

For more information on operation of a suitable projectile including a RNCS that may further include thermopiles for horizon sensing in addition to or in lieu of GPS 139, see the aforementioned '442 patent.

Figure 11:
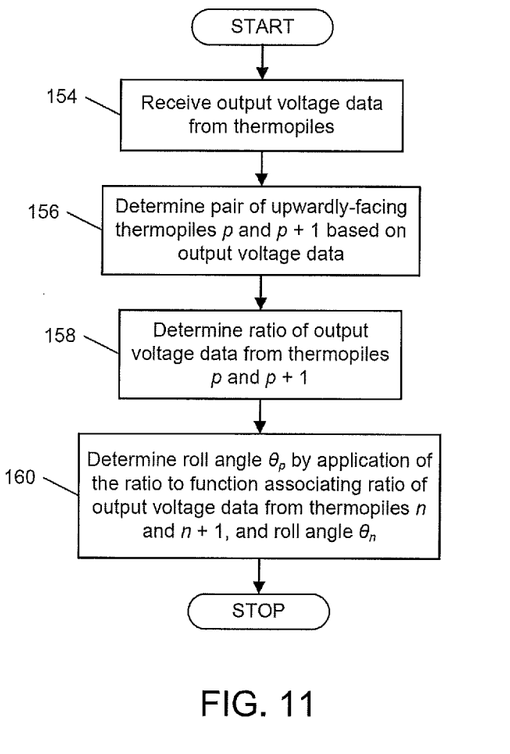
FIG. 11 is a flowchart illustrating various operations that may be performed by on-board electronic circuitry according to example embodiments of the present invention.

Reference is made to FIG. 11, which presents a flowchart illustrating various operations that may be performed by the on-board electronic circuitry 140 according to example embodiments of the present invention. As shown in block 154, the operations may include receiving output voltage data from an array of at least four thermopiles 138 placed around the circumference of a projectile such that for any rotation of the projectile during flight thereof, at least a pair of the thermopile having upwardly-facing fields of view referenced to the earth-fixed coordinate system. In one example, the projectile is a spin-stabilized projectile including a despun nose section onto which the thermopiles of the array are placed, and the thermopiles are LWIR thermopiles.

The operations may also include determining the pair of upwardly-facing thermopiles based on the output voltage data from the array, with the respective pair of thermopiles including a thermopile p and next adjacent thermopile p+1, as shown in block 156. In one example, the pair of upwardly-facing thermopiles may be determined by calculating a sum of the voltages of each pair of adjacent thermopiles, and identifying the pair whose sum is most negative.

The operations may include determining a ratio of the output voltage data from thermopiles p and p+1, as shown in block 158. And the operations may include applying the ratio to a function associating, for any pair of thermopiles n and n+1, a ratio of output voltage data from thermopiles n and n+1, and a roll angle $\theta_n$ of thermopile n referenced to the earth-fixed coordinate system, as shown in block 160. In this regard, the ratio of the output voltage data from thermopiles p and p+1 may be applied to the function to determine a roll angle $\theta_p$ of thermopile p referenced to the earth-fixed coordinate system, with the roll angle $\theta_p$ representing an orientation of the projectile referenced to the earth-fixed coordinate system. In one example, each thermopile of the array is rotatable about a longitudinal axis of the projectile, and the roll angle $\theta_p$ is the angle between horizontal of the earth-fixed coordinate system and thermopile p.

In one example, the function to which the ratio is applied is a function having been generated from a second function associating, for any thermopile n, output voltage data from thermopile n and the roll angle $\theta_n$.

In one example, the operations may further include removing an effective bias value from the output voltage data from at least thermopiles p and p+1 to produce bias-corrected output voltage data for the respective thermopiles, with the effective bias value representing a bias on the output voltages imparted by an ambient air temperature. In this example, the function to which the ratio is applied associates a ratio of bias-corrected output voltage data from thermopiles n and n+1, and the roll angle $\theta_n$.

In one example, the operations may further include determining a rate of rotation of the projectile in at least first and second instances. Operations including receiving the output voltage data, determining the pair of upwardly-facing thermopiles, and determining and applying the ratio may occur in the first instance in which the rate of rotation is lower than in the second instance. And in the second instance, the operations may include receiving data from a GPS placed on the projectile, and determining the orientation of the projectile referenced to the earth-fixed coordinate system based on the data from the GPS.

According to one aspect of the example embodiments of present invention, functions or operations performed by the on-board electronic circuitry 140, such as those illustrated by the flowchart of FIG. 11, may be performed by various means. It will be understood that each block or operation of the flowchart, and/or combinations of blocks or operations in the flowchart, can be implemented by various means. Means for implementing the blocks or operations of the flowchart, combinations of the blocks or operations in the flowchart, or other functionality of example embodiments of the present invention described herein may include hardware, alone or under direction of one or more computer program code instructions, program instructions or executable computer-readable program code instructions from a computer-readable storage medium (e.g., non-transitory, non-volatile memory 142, RAM 144, etc.).

Program code instructions may be stored on a memory device and executed by a processor, such as the processor(s) 146 of the example on-board electronic circuitry 140. As will be appreciated, any such program code instructions may be loaded onto a processor or other programmable apparatus to form a computer-readable storage medium to produce a particular machine, such that the particular machine becomes a means for implementing the functions specified in the flowchart's block(s) or operation(s). These program code instructions may also be stored in a computer-readable storage medium that can direct a processor or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowchart's block(s) or operation(s). The program code instructions may be retrieved from a computer-readable storage medium and loaded into a processor or other programmable apparatus to configure the processor or other programmable apparatus to execute operations to be performed on or by the processor or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the processor or other programmable apparatus provide operations for implementing the functions specified in the flowchart's block(s) or operation(s).

Accordingly, execution of instructions associated with the blocks or operations of the flowchart by a processor, or storage of instructions associated with the blocks or operations of the flowchart in a computer-readable storage medium, supports combinations of operations for performing the specified functions. It will also be understood that one or more blocks or operations of the flowchart, and combinations of blocks or operations in the flowchart, may be implemented by special purpose hardware-based computer systems and/or processor s which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
    electronic circuitry mountable on a projectile including an array of at least four thermopiles placed around the circumference thereof such that for any rotation of the projectile during flight thereof, at least a pair of the thermopiles have upwardly-facing fields of view referenced to an earth-fixed coordinate system,
    wherein the electronic circuitry is configured to receive output voltage data from the array, and determine the pair of upwardly-facing thermopiles based on the output voltage data from the array, the respective pair of thermopiles including a thermopile p and next adjacent thermopile p+1,
    wherein the electronic circuitry is configured to determine a ratio of the output voltage data from thermopiles p and p+1, and apply the ratio to a function associating, for any pair of thermopiles n and n+1, a ratio of output voltage data from thermopiles n and n+1, and a roll angle $\theta_n$ of thermopile n referenced to the earth-fixed coordinate system, and
    wherein the ratio of the output voltage data from thermopiles p and p+1 is applied to the function to determine a roll angle $\theta_p$ of thermopile p referenced to the earth-fixed coordinate system, the roll angle $\theta_p$ representing an orientation of the projectile referenced to the earth-fixed coordinate system.

2. The apparatus of claim 1, wherein the projectile is a spin-stabilized projectile including a despun nose section onto which the thermopiles of the array are placed, the thermopiles being long wavelength infrared (LWIR) thermopiles.

3. The apparatus of claim 1, wherein the electronic circuitry being configured to determine the pair of upwardly-facing thermopiles includes being configured to calculate a sum of the voltages of each pair of adjacent thermopiles, and identify the pair whose sum is most negative.

4. The apparatus of claim 1, wherein the electronic circuitry is further configured to remove an effective bias value from the output voltage data from at least thermopiles p and p+1 to produce bias-corrected output voltage data for the respective thermopiles, the effective bias value representing a bias on the output voltages imparted by an ambient air temperature, and
    wherein the function to which the ratio is applied associates a ratio of bias-corrected output voltage data from thermopiles n and n+1, and the roll angle Bn.

5. The apparatus of claim 1, wherein each thermopile of the array is rotatable about a longitudinal axis of the projectile, and the roll angle $\theta_p$ is the angle between horizontal of the earth-fixed coordinate system and thermopile p.

6. The apparatus of claim 1, wherein the function to which the ratio is applied is a function having been generated from a second function associating, for any thermopile n, output voltage data from thermopile n and the roll angle $\theta_n$.

7. The apparatus of claim 1, wherein the electronic circuitry is further configured to determine a rate of rotation of the projectile in at least first and second instances,
    wherein the electronic circuitry is configured to receive the output voltage data, determine the pair of upwardly-facing thermopiles, and determine and apply the ratio in the first instance in which the rate of rotation is lower than in the second instance, and wherein in the second instance, the electronic circuitry is configured to receive data from a Global Positioning System (GPS) placed on the projectile, and determine the orientation of the projectile referenced to the earth-fixed coordinate system based on the data from the GPS.

8. A method comprising:
    receiving output voltage data from an array of at least four thermopiles placed around the circumference of a projectile such that for any rotation of the projectile during flight thereof, at least a pair of the thermopiles have upwardly-facing fields of view referenced to an earth-fixed coordinate system;
    determining the pair of upwardly-hieing thermopiles based on the output voltage data from the array, the respective pair of thermopiles including a thermopile p and next adjacent thermopile p+1;
    determining a ratio of the output voltage data from thermopiles p and p+1; and
    applying the ratio to a function associating, for any pair of thermopiles n and n+1, a ratio of output voltage data from thermopiles n and n+1, and a roll angle $\theta_n$ of thermopile n referenced to the earth-fixed coordinate system,
    wherein the ratio of the output voltage data from thermopiles p and p+1 is applied to the function to determine a roll angle $\theta_p$ of thermopile p referenced to the earth-fixed coordinate system, the roll angle $\theta_p$ representing an orientation of the projectile referenced to the earth-fixed coordinate system.

9. The method of claim 8, wherein the projectile is a spin-stabilized projectile including a despun nose section onto which the thermopiles of the array are placed, the thermopiles being long wavelength infrared (L WIR) thermopiles.

10. The method of claim 8, wherein determining the pair of upwardly-facing thermopiles comprises calculating a sum of the voltages of each pair of adjacent thermopiles, and identifying the pair whose sum is most negative.

11. The method of claim 8 further comprising:
removing an effective bias value from the output voltage data from at least thermopiles p and p+1 to produce bias-corrected output voltage data for the respective thermopiles, the effective bias value representing a bias on the output voltages imparted by an ambient air temperature,
wherein the function to which the ratio is applied associates a ratio of biascorrected output voltage data from thermopiles n and n+1, and the roll angle $\theta_n$.

12. The method of claim 8, wherein each thermopile of the array is rotatable about a longitudinal axis of the projectile, and the roll angle $\theta_p$ is the angle between horizontal of the earth-fixed coordinate system and thermopile p.

13. The method of claim 8, wherein the function to which the ratio is applied is a function having been generated from a second function associating, far any thermopile n, output voltage data from thermopile n and the roll angle $\theta_n$.

14. The method of claim 8 further comprising:
determining a rate of rotation of the projectile in at least first and second instances, receiving the output voltage data, determining the pair of upwardly-facing thermopiles, and determining and applying the ratio occur in the first instance in which the rate of rotation is lower than in the second instance; and in the second instance,
receiving data from a Global Positioning System (GPS) placed on the projectile; and
determining the orientation of the projectile referenced to the earth-fixed coordinate system based on the data from the GPS.

15. A computer-readable storage medium having computer-readable program code portions stored therein, the computer-readable program portions comprising:
a first executable portion configured to receive output voltage data from an array of at least four thermopiles placed around the circumference of a projectile such that for any rotation of the projectile during flight thereof, at least a pair of the thermopiles have upwardly-facing fields of view referenced to an earth-fixed coordinate system;
a second executable portion configured to determine the pair of upwardly-facing thermopiles based on the output voltage data from the array, the respective pair of thermopiles including a thermopile p and next adjacent thermopile p+1;
a third executable portion configured to determine a ratio of the output voltage data from thermopiles p and p+1; and
a fourth executable portion configured to apply the ratio to a function associating, for any pair of thermopiles n and n+1, a ratio of output voltage data from thermopiles n and n+1, and a roll angle en of thermopile n referenced to the earth-fixed coordinate system, wherein the ratio of the output voltage data from thermopiles p and p+1 is applied to the function to determine a roll angle $\theta_p$ of thermopile p referenced to the earth-fixed coordinate system, the roll angle $\theta_p$ representing an orientation of the projectile referenced to the earth-fixed coordinate system.

16. The computer-readable storage medium of claim 15, wherein the projectile is a spin-stabilized projectile including a despun nose section onto which the thermopiles of the array are placed, the thermopiles being long wavelength infrared (LWIR) thermopiles.

17. The computer-readable storage medium of claim 15, wherein the second executable portion being configured to determine the pair of upwardly-facing thermopiles includes being configured to calculate a sum of the voltages of each pair of adjacent thermopiles, and identify the pair whose sum is most negative.

18. The computer-readable storage medium of claim 15, wherein the computer-readable program portions further comprise:
a fifth executable portion configured to remove an effective bias value from the output voltage data from at least thermopiles p and p+1 to produce bias-corrected output voltage data for the respective thermopiles, the effective bias value representing a bias on the output voltages imparted by an ambient air temperature,
wherein the function to which the ratio is applied associates a ratio of bias-corrected output voltage data from thermopiles n and n+1, and the roll angle $\theta_n$.

19. The computer-readable storage medium of claim 15, wherein each thermopile of the array is rotatable about a longitudinal axis of the projectile, and the roll angle $\theta_p$ is the angle between horizontal of the earth-fixed coordinate system and thermopile p.

20. The computer-readable storage medium of claim 15, wherein the function to which the ratio is applied is a function having been generated from a second function associating, for any thermopile n, output voltage data from thermopile n and the roll angle $\theta_n$.

21. The computer-readable storage medium of claim 15, wherein the computer-readable program portions further comprise:
a fifth executable portion configured to determine a rate of rotation of the projectile in at least first and second instances, the first, second, third and fourth executable portions being configured to receive the output voltage data, determine the pair of upwardly-facing thermopiles, and determine and apply the ratio in the first instance in which the rate of rotation is lower than in the second instance;
a sixth executable portion configured to receive data from a Global Positioning System (GPS) placed on the projectile; and
a seventh executable portion configured to determine the orientation of the projectile referenced to the earth-fixed coordinate system based on the data from the GPS,
wherein the sixth and seventh executable portions are configured to receive data from the GPS and determine the orientation in the second instance.

* * * * *